US008885309B2

(12) United States Patent
Kang et al.

(10) Patent No.: US 8,885,309 B2
(45) Date of Patent: Nov. 11, 2014

(54) UNDERVOLTAGE PROTECTION SYSTEM

(75) Inventors: Taeghyun Kang, Scarborough, ME (US); Alister Young, Scarborough, ME (US); Duane Connerney, Scarborough, ME (US)

(73) Assignee: Fairchild Semiconductor Corporation, San Jose, CA (US)

( * ) Notice: Subject to any disclaimer, the term of this patent is extended or adjusted under 35 U.S.C. 154(b) by 142 days.

(21) Appl. No.: 13/424,960

(22) Filed: Mar. 20, 2012

(65) Prior Publication Data

US 2012/0243132 A1 Sep. 27, 2012

Related U.S. Application Data

(60) Provisional application No. 61/467,210, filed on Mar. 24, 2011.

(51) Int. Cl.
*H02H 3/24* (2006.01)

(52) U.S. Cl.
CPC ............................... *H02H 3/24* (2013.01)
USPC .............. 361/92; 361/91.5; 361/56; 361/91.1

(58) Field of Classification Search
CPC ............ H01L 27/0266; H01L 27/0274; H01L 27/0281; H01L 27/0285; H02H 3/24; H02H 3/207
USPC .................................... 361/91.1, 92, 56, 91.5
See application file for complete search history.

(56) References Cited

U.S. PATENT DOCUMENTS

| 6,242,793 | B1 | 6/2001 | Colombo et al. | |
|---|---|---|---|---|
| 6,660,602 | B1 | 12/2003 | Vashchenko et al. | |
| 6,728,086 | B2 * | 4/2004 | Hung et al. | 361/56 |
| 7,190,563 | B2 * | 3/2007 | Shibib | 361/56 |
| 7,529,070 | B2 * | 5/2009 | Bhattacharya et al. | 361/56 |
| 7,701,682 | B2 | 4/2010 | Goyal et al. | |
| 7,800,167 | B2 | 9/2010 | Kitamura et al. | |
| 7,846,066 | B1 | 12/2010 | Chuang | |
| 7,969,698 | B2 * | 6/2011 | Ansel et al. | 361/56 |
| 2003/0133237 | A1 | 7/2003 | Hung et al. | |
| 2006/0203405 | A1 | 9/2006 | Bhattacharya et al. | |
| 2008/0225451 | A1 | 9/2008 | Ansel et al. | |

FOREIGN PATENT DOCUMENTS

TW 502428 B 9/2002

* cited by examiner

*Primary Examiner* — Zeev V Kitov
(74) *Attorney, Agent, or Firm* — Grossman Tucker Perreault & Pfleger PLLC

(57) ABSTRACT

A system includes undervoltage protection circuitry coupled in parallel with electronic circuitry configured to receive a supply voltage from a power supply. The undervoltage protection circuitry is configured to shunt undervoltage current resulting from an undervoltage transient in the supply voltage away from the electronic circuitry.

16 Claims, 4 Drawing Sheets

UNDERVOLTAGE PROTECTION SYSTEM

This application claims the benefit of U.S. Provisional Application No. 61/467,210 filed Mar. 24, 2011, which is incorporated by reference herein in its entirety.

FIELD

The present disclosure relates generally to voltage protection systems, and, more particularly, to an undervoltage protection system.

BACKGROUND

Power supplies often have transient voltage events that can cause significant damage to an electronic device receiving power from the power supply. While most devices include overvoltage transient protection circuits (e.g., electrostatic discharge circuits (ESD), ground fault tolerant circuits, etc.), undervoltage transient events often go undetected and unmanaged. For example, an undervoltage transient event may occur when a power connector, jack, or adapter is initially attached to and/or detached from the electronic device. During the undervoltage transient event, large currents may begin to flow through the device, and the overvoltage transient protection circuit, the electronic device, or both may be damaged in the process.

BRIEF DESCRIPTION OF THE DRAWINGS

Features and advantages of the claimed subject matter will be apparent from the following detailed description of embodiments consistent therewith, which description should be considered with reference to the accompanying drawings, wherein:

DETAILED DESCRIPTION

Generally, the present disclosure provides an undervoltage protection system (and various methods) to provide undervoltage protection for an electronic device/circuitry coupled to a power rail. In general, the undervoltage protection system may be provided at the input of a power supply coupling, and operates to shunt transient currents resulting from undervoltage and overvoltage conditions occurring on the power rail away from the electronic device/circuitry. Advantageously, an undervoltage protection system consistent with the present disclosure may be coupled to a wide variety of power supply configurations for providing voltage transient protection for electronic devices/circuitry while allowing use of conventional high voltage ESD circuitry and facilitating steady-state operation of the electronic devices/circuitry.

Figure 1:
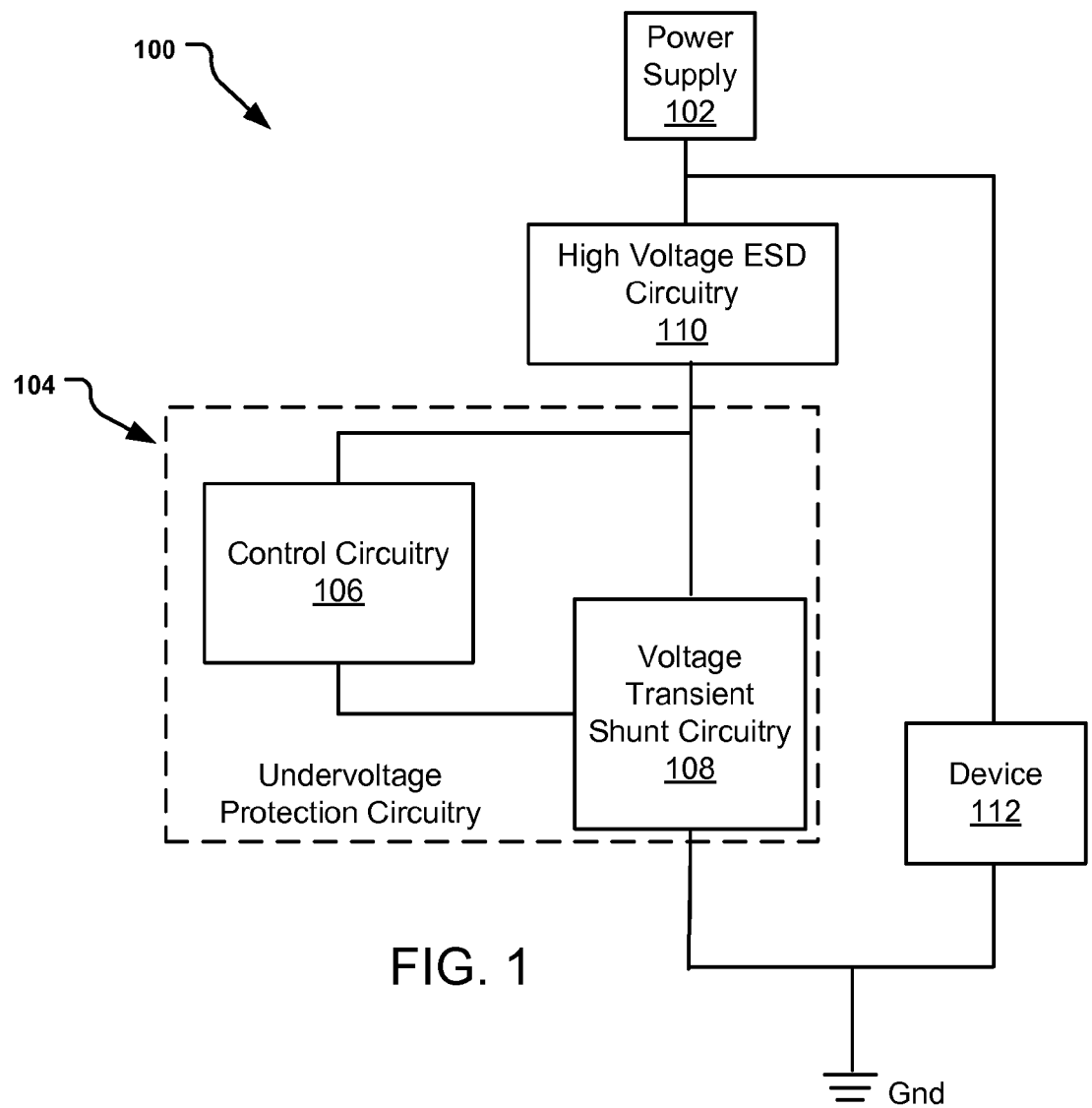
FIG. 1 illustrates an undervoltage protection system consistent with various embodiments of the present disclosure.

FIG. 1 illustrates an undervoltage protection system 100 consistent with various embodiments of the present disclosure. As a general overview, the undervoltage transient (UVT) protection system 100 includes undervoltage protection circuitry 104 coupled to power supply 102, e.g., in some embodiments, through high voltage ESD circuitry 110. Electronic device/circuitry 112 may be coupled to the power supply 102 in parallel with the undervoltage protection circuitry 104 and, in some embodiments, in parallel with the combination of the undervoltage protection circuitry 104 and the high voltage ESD circuitry 110.

In general, the undervoltage protection circuitry 104 is configured shunt transient currents resulting from undervoltage and overvoltage events that may occur on the power supply 102, so that the transient currents are not completely provided to, or from, electronic device/circuitry 112. The term "undervoltage," as used herein, means a voltage event that is below a ground (GND) or reference potential associated with the power supply 102 which is also in common with the electronic device/circuitry 112 as well as the undervoltage protection circuitry 104 and the high voltage ESD circuitry, and may include, for example a negative voltage transient event. The term "overvoltage," as used herein, means a voltage event that is above a steady-state DC potential associated with the power supply 102, and may include, for example a positive voltage transient event.

The high voltage ESD circuitry 110 may include conventional ESD circuitry, such as diode stacks, SCR, active clamps, etc., used to shunt overvoltage transient conditions on the power supply 102 from the electronic device/circuitry 112. The electronic device/circuitry 112 may include, for example, other circuits and/or systems associated with an integrated circuit (IC), system on chip (SoC), etc.

The undervoltage protection circuitry 104 may include control circuitry 106 and voltage transient shunt circuitry 108. The control circuitry 106 is configured to control a conduction state of the voltage transient shunt circuitry 108, in response to the voltage state of the power supply 102. For example, when the power supply 102 is generating a positive steady-state DC potential, the control circuitry 106 may be configured to set the voltage transient circuitry 108 in a non-conducting state so that the voltage transient shunt circuitry 108, and hence the undervoltage protection circuitry 104, present an open circuit (or otherwise very high relative impedance) in parallel with the device 112, thus allowing the device 112 to operate with little or no effect from the undervoltage protection circuitry 104. However, when an overvoltage or undervoltage transient event occurs on the power supply 102, the control circuitry 106 may be configured to set the voltage transient shunt circuitry 108 to a conducting state so that current flow that may result from a transient event is drawn through the undervoltage protection circuitry 104 instead of the parallel connected device 112.

Figure 2:
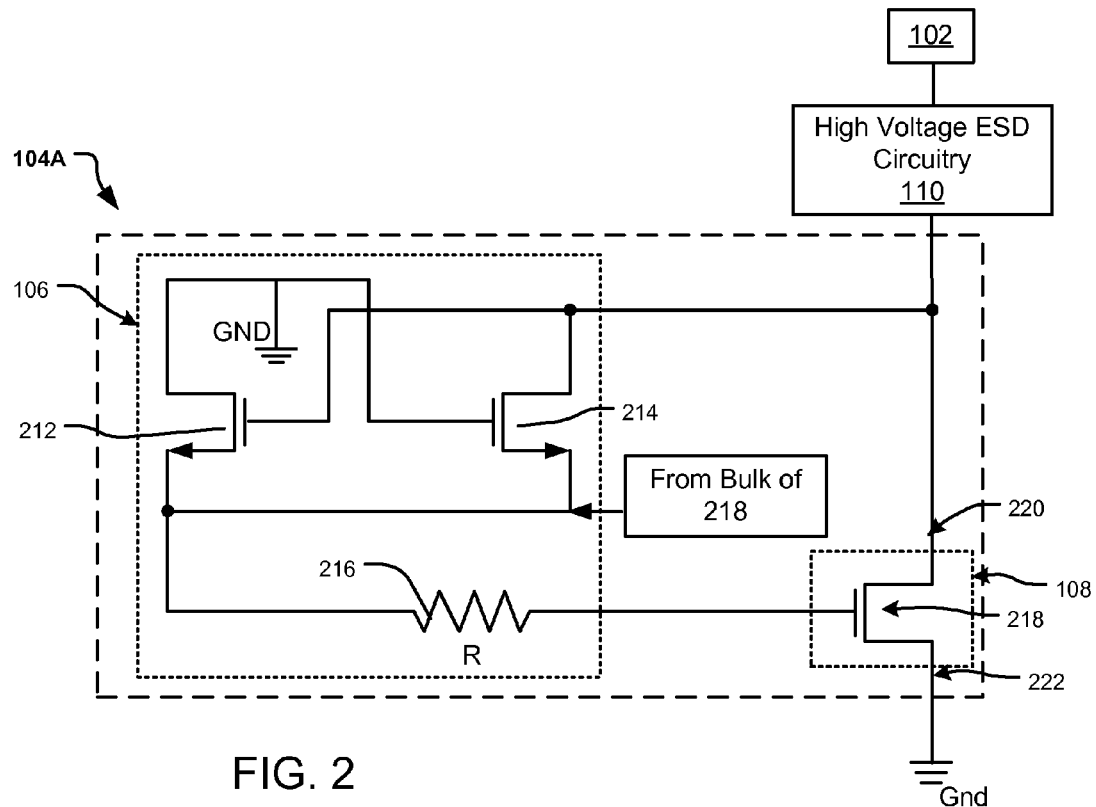
FIG. 2 illustrates a schematic view of the undervoltage protection circuitry of FIG. 1.

FIG. 2 illustrates a circuit example of the undervoltage protection circuitry 104A consistent with one embodiment of the present disclosure. In this example, the controller circuitry 106 includes a first transistor 212, a second transistor 214 and a bias resistor 216. The first transistor 212 is coupled between a ground (or reference) potential GND and the voltage transient shunt circuitry 108, through the bias resistor 216. The gate of the first transistor 212 is coupled to the input power supply 102. The second transistor 214 is coupled between the input power supply 102 and the voltage transient shunt circuitry 108, through the bias resistor 216. The gate of the second transistor 214 is coupled to GND.

The voltage transient shunt circuitry 108, in the example of FIG. 2, includes switch circuitry 218 configured to change conduction state in response to an overvoltage or undervoltage transient in the power supply output voltage to shunt current away from the device 112. In the illustrated example, the switch circuitry is coupled between the power supply 102 and the high voltage ESD circuitry 110. The switch circuitry 218 may include any type of switching device (BJT, MOSFET, etc.), and in one embodiment includes an isolated NMOS transistor.

Figure 3:
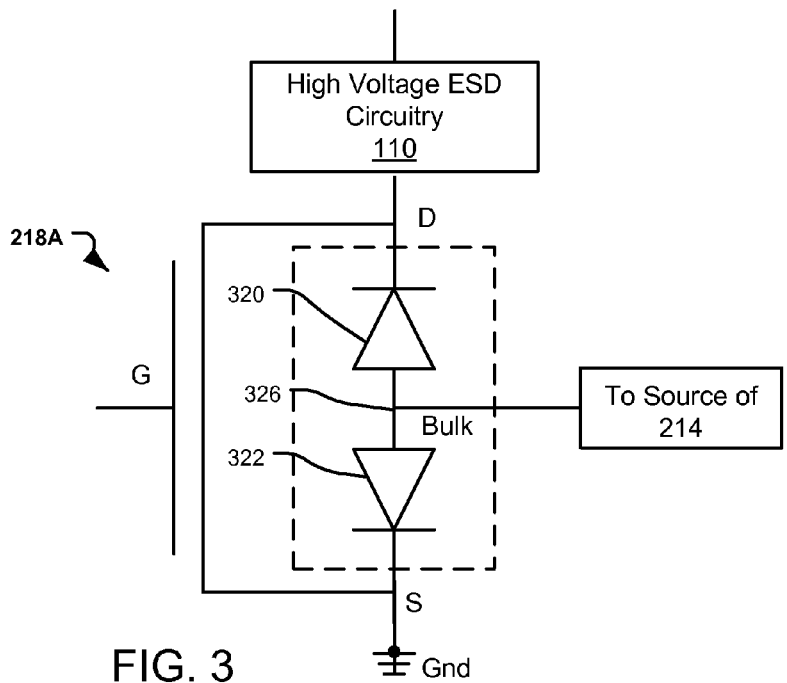
FIG. 3 illustrates a schematic view of one exemplary embodiment of the voltage transient shunt circuitry of FIG. 2.

Generally, an "isolated" device means that the drain/bulk and source/bulk junction diodes of the device are isolated, physically and electrically, from the containing substrate. For example, in an isolated device may include an additional n-type diffusion to p-type substrate junction diode with a large breakdown characteristic voltage. Referring briefly to FIG. 3, a circuit example of an isolated NMOS transistor 218A is illustrated. The isolated NMOS transistor 218A may be a bulk junction device that includes a drain to bulk junction diode 320 coupled between a drain (D) of the device and a bulk junction node 326 (Bulk), and a source to bulk junction diode 322 coupled between a source (S) of the device and the bulk junction mode 326.

Continuing with the example of FIG. 2, the bulk junction node of the switch circuitry 218 may be coupled to the source of the first transistor 212 and the source of the second 214 transistor. In this configuration, the switch circuitry 218 may include a symmetrical switching device with a bulk junction node at the same potential as the sources of the first 212 and second 214 transistors. As is known, a symmetrical NMOS device, for example, has no directional preference for the source and drain of the device, i.e. the drain becomes the source when the drain voltage is lower than the source voltage. Since the switching circuitry 218A includes a symmetrical device, under some conditions the terminal 222 of the switch circuitry 218A may act as the source of the device 218, e.g. in response to positive power supply voltage values, and under other conditions the terminal 220 of the switch circuitry 218A may act as the source of the device 218, e.g. in response to negative power supply voltage values.

Accordingly, when the power supply 102 is in a steady-state DC operating mode, i.e. in the absence of any positive or negative overvoltage event, the control circuitry 106 is configured to maintain the switch circuitry 218 in non-conducting state so that current from the power supply 102 is provided through device 112 (FIG. 1). When an overvoltage transient occurs, the control circuitry 106 is configured to place the switch circuitry 218 in a conducting state during the overvoltage transient with the terminal 222 acting as the source of the switch circuitry 218. In this mode, the voltage transient shunt circuitry 108 shunts current from the power supply 102 away from the device 112 and through the high voltage ESD circuitry 110. When an undervoltage transient occurs, the control circuitry 106 is configured to place the switch circuitry 218 in conducting state during the undervoltage transient with the terminal 220 acting as the source of the switch circuitry 218. In this mode, the voltage transient shunt circuitry 108 sources current to the power supply, e.g. through the high voltage ESD circuitry 110, to shunt the current draw from the device 112 to reduce or avoid a spike in current in the device 112.

For example, in an undervoltage protection system including the control circuitry 106 shown in the example of FIG. 2 and switch circuitry 218A as shown in the example of FIG. 3, in a DC steady-state condition the positive DC output voltage of the power supply 102 forward-biases the gate-source of the first transistor 212 to set the first transistor 212 in a conducting state while maintaining the second transistor 214 in an non-conducting state. With the first transistor 212 conducting, the source of the transistor 212 and the bulk junction node 326 are at GND potential and the switch circuitry 218A is held in a non-conducting state to reduce or eliminate current flow through the undervoltage protection circuitry 104A and the high voltage ESD circuitry 110. In this operating mode, current from the power supply is provided directly to the device 112 with little or no effect from the undervoltage protection circuitry 104A.

Figure 4:
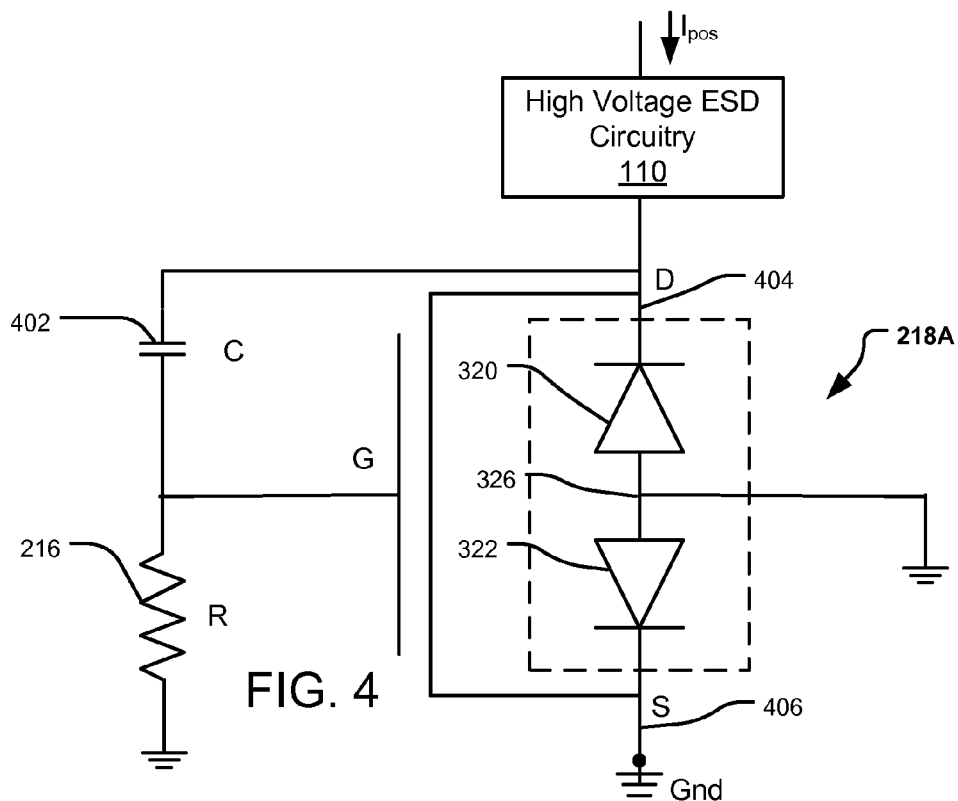
FIG. 4 is a schematic view illustrating operation of the undervoltage protection circuitry of FIG. 2 including the voltage transient shunt circuitry of FIG. 3 in an overvoltage transient condition.

Upon occurrence of a transient event at the output of the power supply 102, the undervoltage protection circuitry closes the switch circuitry 218A to shunt current from the device 112. FIG. 4, for example, is a circuit diagram illustrating operation of the undervoltage protection circuitry 104A (FIG. 2) including switch circuitry 218A in response to an undervoltage transient. Upon occurrence of an undervoltage transient, the gate-source of the first transistor 212 remains forward-biased to keep the first transistor 212 in a conducting state while maintaining the second transistor 214 in a non-conducting state. With the first transistor 212 conducting, the source of the transistor 212 and the bulk junction node 326 are at GND potential, as illustrated in FIG. 4.

The positive voltage transient from the power supply 102 establishes an overvoltage current $I_{pos}$. The current $I_{pos}$ charges the capacitance 402 between the gate and terminal 404 of the switching circuitry 218A. As the capacitance 402 charges, the gate voltage of the switching circuitry 218A increases to a level above the voltage at the terminal 406 to forward-bias the junction between the gate and terminal 406. Since the switching circuitry includes a symmetrical device, terminal 406 becomes the source (S) of the switching circuitry 218A and terminal 404 becomes the drain (D) of the switching circuitry 218A, as shown. With the gate-source of the switching circuitry 218A forward-biased, the switching circuitry 218A is set in a conducting state, either in a full-on mode or in its linear mode. With the switching circuitry 218A conducting, current $I_{pos}$ associated with the overvoltage transient is shunted away from the device 102, through the switching circuitry 218A and to the high voltage ESD circuitry 110.

Figure 5:
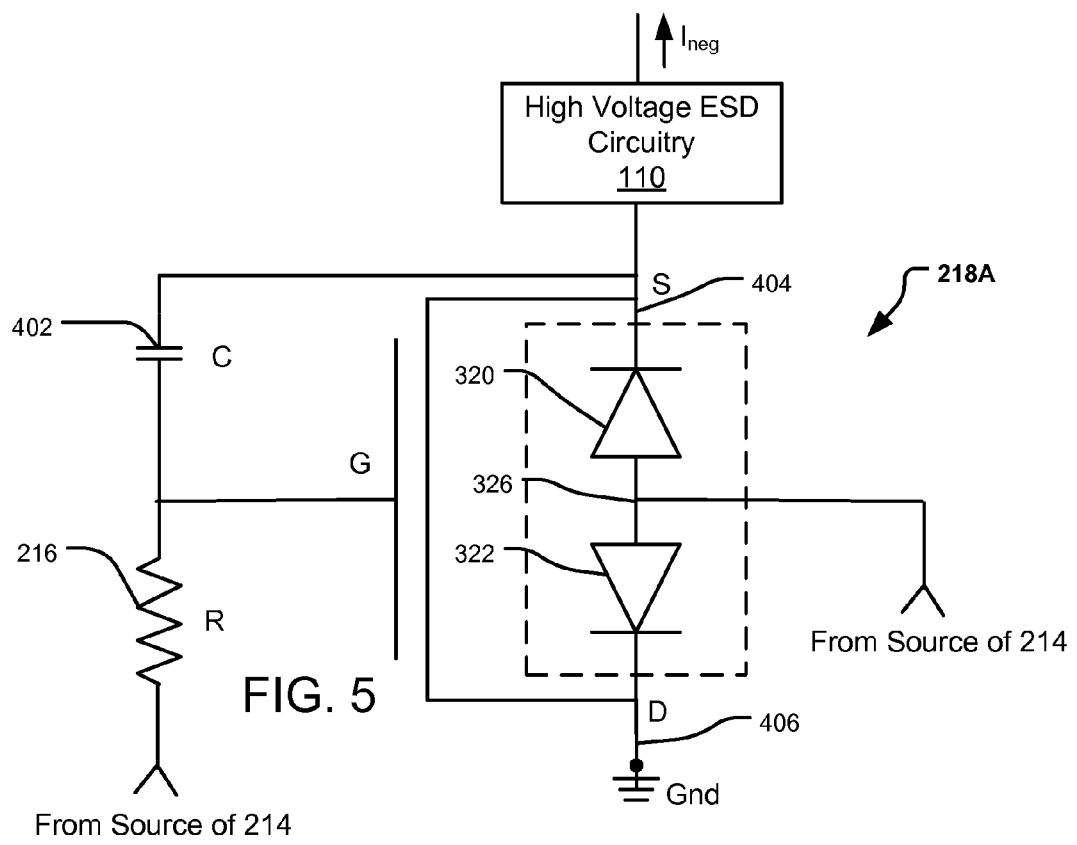
FIG. 5 is a schematic view illustrating operation of the undervoltage protection circuitry of FIG. 2 including the voltage transient shunt circuitry of FIG. 3 in an undervoltage transient condition.

FIG. 5 is a circuit diagram illustrating operation of the undervoltage protection circuitry including switch circuitry 218A in response to an undervoltage transient. Upon occurrence of an undervoltage transient, the gate-source of the second transistor 214 is forward-biased to set the second transistor 214 in a conducting state while the gate-source of the first transistor 212 is reverse-biased setting the first transistor 212 in a non-conducting state. With the second transistor 214 conducting, the source of the second transistor 214 and the bulk junction node 326 are at the undervoltage transient potential plus the voltage drop across second transistor 214, as illustrated in FIG. 5.

The negative voltage transient from the power supply 102 establishes an undervoltage current $I_{neg}$ in the opposite direction compared to current associated with a positive voltage transient. The current $I_{neg}$ charges the capacitance 402 between the gate and terminal 404 of the switching circuitry 218A. As the capacitance 402 charges the gate voltage of the switching circuitry 218A increases to a level above the voltage at the terminal 404 to forward-bias the junction between the gate and terminal 404. Since the switching circuitry 218A includes a symmetrical device, terminal 404 now becomes the source (S) of the switching circuitry 218 and terminal 406 becomes the drain (D) of the switching circuitry 218, as shown. With the gate-source of the switching circuitry 218A forward-biased, the switching circuitry 218A is set in a conducting state, either in a full-on mode or in its linear mode. With the switching circuitry 218A conducting, current $I_{neg}$ associated with the undervoltage transient is drawn from the switching circuitry 218A and the high voltage ESD circuitry 110 to the power supply 102, thereby protecting the device 112 from sourcing significant damaging current as a result of the undervoltage transient.

The voltage level at which the switching circuitry 218A transitions to a conducting state in response to both an undervoltage and overvoltage transient may be established through selection of the bias resistor 216 and the capacitance 402. In some configurations, for example, the bias resistor 216 may be a variable resistor to allow selective setting of the voltage level at which the switching circuitry 218A conducts in response to a voltage transient. Also the breakdown voltages of the diodes 320 and 322 may be selected to exceed the expected voltage transients so that the diodes do not break down in a transient condition. Advantageously, by selecting the high voltage ESD circuitry 110 and configuring the bias conditions of the undervoltage protection circuitry 104, the operating region of a transient voltage protection system consistent with the present disclosure may be extended or shifted to provide protection against any positive and/or negative voltage transient in a variety of circuit configurations including mixed-signal configurations. In one particular application of the present disclosure, for example, the undervoltage protection system may be configured to cover a –5V to 28V range on a power rail, which may be particularly useful for a Vbus power supply present on many mobile devices.

Figure 6:
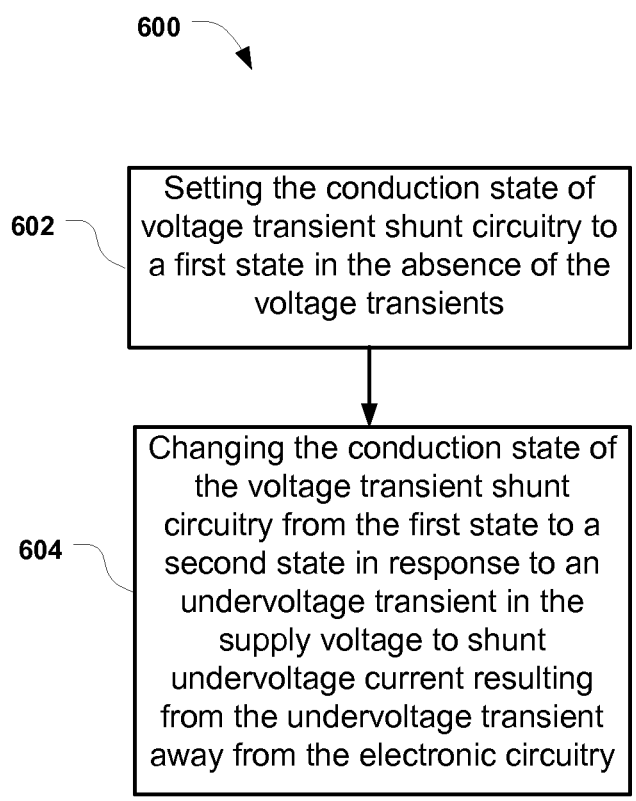
FIG. 6 illustrates a flowchart of operations according to one embodiment of the present disclosure.

FIG. 6 illustrates a flowchart 600 of operations according to one embodiment 600 of the present disclosure for protecting electronic circuitry from voltage transients in a supply voltage to the electronic circuitry. Operations of this embodiment may include setting 602 the conduction state of voltage transient shunt circuitry to a first state in the absence of the voltage transients. For example, the conduction state of the voltage transient shunt circuitry may be set in a non-conducting state to allow the power supply to power the electronic circuitry with little or no interference. Operations of this embodiment may further include changing 604 the conduction state of the voltage transient shunt circuitry from the first state to a second state in response to an undervoltage transient in the supply voltage to shunt undervoltage current resulting from the undervoltage transient away from the electronic circuitry. For example, in response to an undervoltage transient the conduction state of the voltage transient shunt circuitry may be set in a conducting state to shunt current away from the electronic circuitry.

While FIG. 6 illustrates various operations according to one embodiment, it is to be understood that in not all of these operations are necessary. Indeed, it is fully contemplated herein that in other embodiments of the present disclosure, the operations depicted in FIG. 6 may be combined in a manner not specifically shown in any of the drawings, but still fully consistent with the present disclosure. Thus, claims directed to features and/or operations that are not exactly shown in one drawing are deemed within the scope and content of the present disclosure. In addition, "circuitry" or "circuit", as used in any embodiment herein, may comprise, for example, singly or in any combination, hardwired circuitry, programmable circuitry, state machine circuitry, and/or circuitry available in a larger system, for example, discrete elements that may be included as part of an integrated circuit.

Thus, in one embodiment the present disclosure provides a voltage transient protection system including undervoltage protection circuitry coupled in parallel with electronic circuitry configured to receive a supply voltage from a power supply. The undervoltage protection circuitry is configured to shunt undervoltage current resulting from an undervoltage transient in the supply voltage away from the electronic circuitry.

In another embodiment, the present disclosure provides a system including electrostatic discharge (ESD) protection circuitry; and undervoltage protection circuitry coupled in series with the ESD protection circuitry and in parallel with electronic circuitry configured to receive a supply voltage from a power supply. The undervoltage protection circuitry includes control circuitry, and voltage transient shunt circuitry coupled to the control circuitry. The control circuitry is configured to change a conduction state of the voltage transient shunt circuitry in response to voltage transients in the supply voltage to shunt undervoltage current resulting from an undervoltage transients in the supply voltage away from the electronic circuitry and to shunt overvoltage current resulting from an overvoltage transients in the supply voltage current away from the electronic circuitry.

In yet another embodiment, the present disclosure provides a method of protecting electronic circuitry from voltage transients in a supply voltage to the electronic circuitry, the method including setting the conduction state of voltage transient shunt circuitry to a first state in the absence of the voltage transients; changing the conduction state of the voltage transient shunt circuitry from the first state to a second state in response to an undervoltage transient in the supply voltage to shunt undervoltage current resulting from the undervoltage transient away from the electronic circuitry.

The terms and expressions which have been employed herein are used as terms of description and not of limitation, and there is no intention, in the use of such terms and expressions, of excluding any equivalents of the features shown and described (or portions thereof), and it is recognized that various modifications are possible within the scope of the claims. Accordingly, the claims are intended to cover all such equivalents. Various features, aspects, and embodiments have been described herein. The features, aspects, and embodiments are susceptible to combination with one another as well as to variation and modification, as will be understood by those having skill in the art. The present disclosure should, therefore, be considered to encompass such combinations, variations, and modifications.

What is claimed is:

1. A voltage transient protection system comprising:
undervoltage protection circuitry coupled in parallel with electronic circuitry configured to receive a supply voltage from a power supply, said undervoltage protection circuitry being configured to shunt undervoltage current resulting from an undervoltage transient in said supply voltage away from said electronic circuitry, said undervoltage protection circuitry comprising:
control circuitry including a first transistor, a second transistor and a resistor; and
voltage transient shunt circuitry including a switching device coupled to said control circuitry;
said first transistor being coupled between a ground potential and a gate of said switching device through said resistor with a gate of said first transistor coupled to said power supply, said second transistor being coupled between said power supply and said gate of said switching device through said resistor with a gate of said second transistor being coupled to said ground potential, said switching device having a bulk terminal coupled to the sources of said first and second transistors;

said control circuitry being configured to change a conduction state of said voltage transient shunt circuitry in response to said undervoltage transient to shunt said undervoltage current away from said electronic circuitry.

2. A system according to claim 1, wherein voltage transient shunt circuitry comprises switching circuitry, said control circuitry being configured to set said switching circuitry in a conducting state in response to said undervoltage transient to shunt said undervoltage current through said undervoltage protection circuitry.

3. A system according to claim 2, wherein said switching circuitry comprises a symmetrical switching device.

4. A system according to claim 2, wherein switching circuitry comprises a field effect transistor having bulk terminal coupled to said control circuitry.

5. A system according to claim 1, wherein said control circuitry comprises bias circuitry configured to control a voltage level at which said voltage transient shunt circuitry changes said conduction state in response to said undervoltage transient.

6. A system according to claim 1, wherein said undervoltage protection circuitry is configured to shunt overvoltage current resulting from an overvoltage transient in said supply voltage current away from said electronic circuitry.

7. A system according to claim 1, said system further comprising electrostatic discharge (ESD) protection circuitry coupled in series with said undervoltage protection circuitry, and wherein said undervoltage protection circuitry is configured to shunt said overvoltage current through said ESD protection circuitry.

8. A system comprising:
electrostatic discharge (ESD) protection circuitry; and
undervoltage protection circuitry coupled in series with said ESD protection circuitry and in parallel with electronic circuitry configured to receive a supply voltage from a power supply,
said undervoltage protection circuitry comprising
control circuitry including a first transistor, a second transistor and a resistor, and
voltage transient shunt circuitry including a switching device coupled to said control circuitry;
said first transistor being coupled between a ground potential and a gate of said switching device through said resistor with a gate of said first transistor coupled to said power supply, said second transistor being coupled between said power supply and said gate of said switching device through said resistor with a gate of said second transistor being coupled to said ground potential, said switching device having a bulk terminal coupled to the sources of said first and second transistors;
said control circuitry being configured to change a conduction state of said voltage transient shunt circuitry in response to voltage transients in said supply voltage to shunt undervoltage current resulting from an undervoltage transients in said supply voltage away from said electronic circuitry and to shunt overvoltage current resulting from an overvoltage transients in said supply voltage current away from said electronic circuitry.

9. A system according to claim 8, wherein said voltage transient shunt circuitry comprises a symmetrical switching device.

10. A system according to claim 8, wherein said voltage transient shunt circuitry comprises a field effect transistor having bulk terminal coupled to said control circuitry.

11. A system according to claim 8, wherein said control circuitry comprises bias circuitry configured to control a voltage level at which said voltage transient shunt circuitry changes said conduction state in response to said undervoltage transient and said overvoltage transient.

12. A method of protecting electronic circuitry from voltage transients in a supply voltage to said electronic circuitry, said method comprising:
setting the conduction state of voltage transient shunt circuitry to a first state in the absence of said voltage transients, said voltage transient shunt circuitry including a switching device coupled to control circuitry including a first transistor, a second transistor and a resistor, said first transistor being coupled between a ground potential and a gate of said switching device through said resistor with a gate of said first transistor coupled to said supply voltage, said second transistor being coupled between said supply voltage and said gate of said switching device through said resistor with a gate of said second transistor being coupled to said ground potential, said switching device having a bulk terminal coupled to the sources of said first and second transistors; and
changing said conduction state of said voltage transient shunt circuitry from said first state to a second state in response to an undervoltage transient in said supply voltage to shunt undervoltage current resulting from said undervoltage transient away from said electronic circuitry.

13. A method according to claim 12, said method further comprising changing said conduction state of said voltage transient shunt circuitry from said first state to said second state in response to an overvoltage transient in said supply voltage to shunt overvoltage current resulting from said overvoltage transient away from said electronic circuitry.

14. A method according to claim 12, wherein said second state is a conducting state.

15. A method according to claim 12, wherein said voltage transient shunt circuitry comprises switching circuitry and wherein said changing said conduction state comprises changing a conduction state of said switching circuitry.

16. A method according to claim 12, wherein said switching circuitry comprises a symmetrical switching device.

* * * * *